Sept. 4, 1956 B. R. HALL 2,761,914

TELEPHONE HANDSET HOLDER

Filed May 10, 1954

INVENTOR.
BERTIE R. HALL
BY
Bruce & Brosler
HIS ATTORNEYS

United States Patent Office 2,761,914

Patented Sept. 4, 1956

2,761,914

TELEPHONE HANDSET HOLDER

Bertie R. Hall, El Cerrito, Calif.

Application May 10, 1954, Serial No. 428,438

6 Claims. (Cl. 179—156)

My invention relates to telephone holders and more particularly to a holder for a telephone of the handset type.

Many devices have been developed for the purpose of holding or supporting a telephone of the handset type, which would free both hands for use while carrying on a telephone conversation. The majority of such devices with which I am familiar, serve to help maintain such phone on the shoulder of the user, but invariably requiring the user to twist his head and neck to position his ear and mouth to the appropriate ends of the phone, while at the same time applying a holding pressure to the phone to prevent shifting thereof on his shoulder. Such manner of holding the phone is necessarily inconvenient and tiring.

Among the objects of the present invention are:

1. To provide a novel and improved holder for a phone and more particularly one of the handset type;

2. To provide a novel and improved holder for a phone of the handset type which does not require any physical distortion or exertion on the part of the user, but permits the user to function completely relaxed;

3. To provide a novel and improved holder for a handset type of phone, which enables complete freedom of movement of the user within the limits permitted by the phone cord.

Additional objects of my invention will be brought out in the following description of a preferred embodiment of the same, taken in conjunction with the accompanying drawings, wherein Figure 1 is a front view depicting the manner of installation and use of the device of the present invention;

Figure 1:
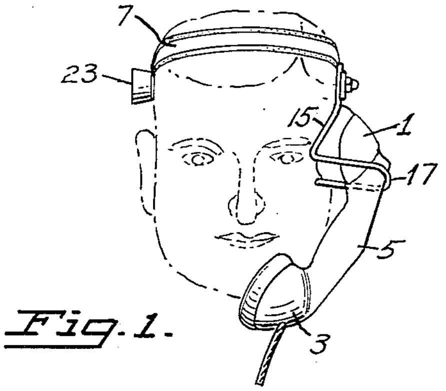
Figure 2:
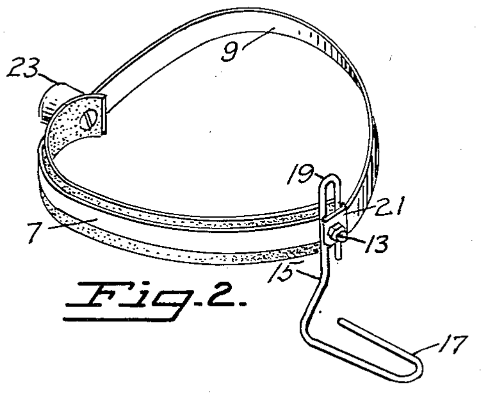
Figure 2 is a three dimensional view of the device per se.
Figures 3, 4:
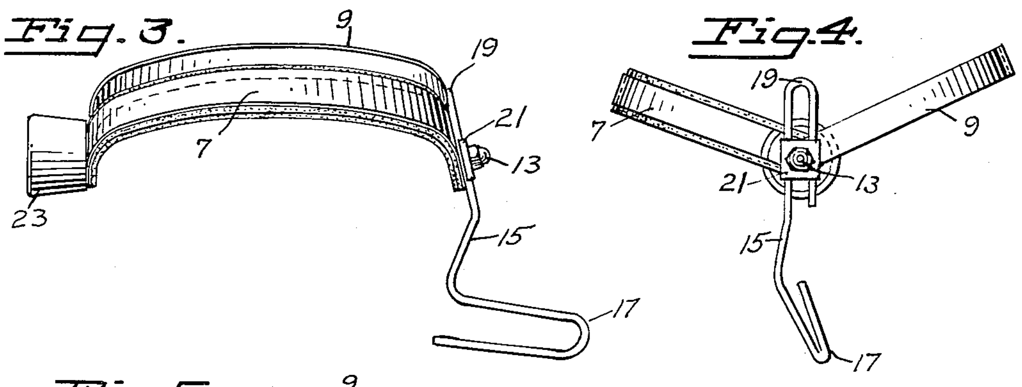
Figure 3 is a front view of the device of Figure 2.
Figure 4 is an end view.
Figures 5, 6:
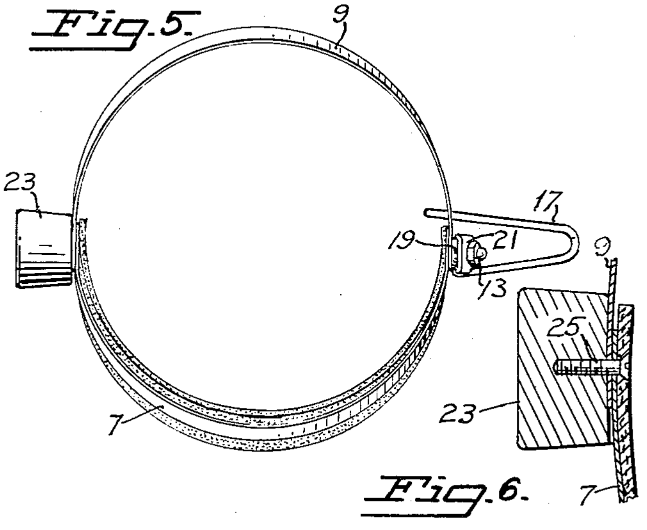
Figure 5 is a top plan view.
Figure 6 is a view in section of a detail of construction of the device of the preceding figure.
Figure 7:
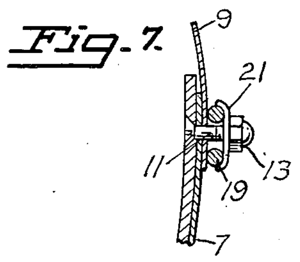
Figure 7 is a view in section of another detail of construction.

Referring to the drawings for details of my invention in its preferred form, the invention is designed for use with a telephone of the handset type which includes a receiver 1 and a transmitter or mouth piece 3 connected into a unitary device by a handgrip 5, said handgrip being formed with an enlarged midsection tapering slightly toward each end.

The holder constituting the present invention is incorporated into a head frame assembly, the head frame being of any conventional type, such as one involving a pair of arched resilient bands 7 and 9 pivotally secured together at their ends to permit of adjusting the angle between them so as to obtain a good fit to the head. At one end the pivotal securing means should preferably involve a bolt 11 and cap nut 13.

To this end is affixed means for holding a telephone handset in proper position for conversational use, that is with the earpiece against the ear and the mouth piece in close proximity to the mouth, to thereby free the hands for the performance of other duties or services.

The holding means includes a shank 15 of heavy wire or light rod adjustably affixed at its upper end to the aforementioned end of the frame and depending therefrom to a point approximately at the elevation of the cheek of the wearer, and at such point, terminating in a lateral extending U-loop 17 lying in a substantially horizontal plane, with the open end of the loop toward the wearer when in use.

The U-loop is spread to a degree just sufficient to snugly receive a handset at a point adjacent the earpiece, and when inserted in such loop, the earpiece will be held in proper position with respect to the ear.

By providing a bend or kink in the shank in the direction of the face of the user, the mouth piece will be swung to a position in proximity to and in front of the mouth of the user, without displacing the earpiece from its assigned position adjacent the ear.

Any adjustments of the handset to more comfortably position the handset is provided by the manner in which the holding means is suspended from the head frame. In this connection, the upper end of the shank is bent back upon itself to form a very narrow U-loop 19 with just sufficient spread to straddle the pivot bolt 11 and permit the shank to slide and pivot with respect to such bolt. This permits the holding means to be adjusted as to both elevation and direction, following which it may be securely held in such adjusted position by a clamping plate 21 applied to the bolt between the shank and the cap nut.

In the device as thus far described, the weight of the handset, which is appreciable, is apt to cause shifting of the head frame, which will render it quite difficult to retain the handset in proper position for use. To overcome such tendency a counterweight is applied to the opposite end of the head frame, such counterweight preferably taking the form of a metal knob 23, centrally threaded to receive a pivot bolt 25 at that end of the head frame. The weight of such knob does not necessarily have to equal that of the hand set to preclude such possible shifting of the head frame, for the frictional resistance to be overcome in producing a shift permits of a relatively small weight for countering the weight of the handset.

By forming such weight in the shape of a knob, the counterweight provides a convenient grip for use by an individual in applying or removing the device.

It will be apparent that the device of the present invention fulfills all the objects attributable thereto, and while I have disclosed the same in its preferred form and in considerable detail, said deviec is subject to alteration and modification without departing from the underlying principles involved, and I do not desire to be limited in my protection to the specific details illustrated and described, except as may be necessitated by the appended claims.

I claim:

1. A handset holder comprising a head frame; and means suspended from an end of said frame for supporting a handset in position for use, with the earpiece adjacent the ear and the mouthpiece in proximity to the mouth, said means including a shank of light rod affixed at one end to such end of said frame and depending therefrom, said shank at approximately the elevation of the cheek of the wearer, terminating in an outwardly extending U-loop, said U-loop having a spread just sufficient to snugly receive a handset at a point adjacent the earpiece and support the same in forwardly extended tilted position in the absence of clamping pressure.

2. A handset holder comprising a head frame; means suspended from an end of said frame for supporting a handset in position for use, with the earpiece adjacent the ear and the mouthpiece in proximity to the mouth, said means including a shank of light rod affixed at one end to such end of said frame and depending therefrom, said shank at approximately the elevation of the cheek of the wearer, terminating in an outwardly extending U-loop lying in substantially a horizontal plane, said U-loop having a spread just sufficient to snugly receive a handset at a point adjacent the earpiece and support the same in forwardly extended tilted position in the absence of clamping pressure, and means for precluding shifting of said frame on the head under the weight of a handset supported in said U-loop.

3. A handset holder comprising a head frame extending from one side of the head to the other when worn; means suspended from an end of said frame for supporting a handset in position for use, with the earpiece adjacent the ear and the mouthpiece in proximity to the mouth, said means including a shank of light rod adjustably affixed at one end to such end of said frame and depending therefrom, said shank at approximately the elevation of the cheek of the wearer, terminating in a laterally extending U-loop lying in substantially a horizontal plane, said U-loop having a spread just sufficient to snugly receive a handset at a point adjacent the earpiece, and means for precluding shifting of said frame on the head under the weight of a handset supported in said U-loop, said means including a weight carried by said frame at its opposite end.

4. A handset holder comprising a head frame extending from one side of the head to the other when worn; means suspended from an end of said frame for supporting a handset in position for use, with the earpiece adjacent the ear and the mouthpiece in proximity to the mouth, said means including a shank of light rod affixed at one end to such end of said frame and depending therefrom, said shank at approximately the elevation of the cheek of the wearer, terminating in a laterally extending U-loop lying in substantially a horizontal plane with its open end toward the wearer when in use, said U-loop having a spread just sufficient to snugly receive a handset at a point adjacent the earpiece, and an angular bend in said shank directing the lower portion thereof toward the face of a wearer to position the mouthpiece of such handset in proximity to the mouth of the wearer, and means for precluding shifting of said frame on the head under the weight of a handset supported in said U-loop.

5. A handset holder comprising a head frame extending from one side of the head to the other when worn, means suspended from an end of said frame for supporting a handset in position for use, with the earpiece adjacent the ear and the mouth piece in proximity to the mouth, said means including a shank of light rod adjustably affixed at one end to such end of said frame and depending therefrom, said shank at approximately the elevation of the cheek of the wearer, terminating in a laterally extending U-loop lying in substantially a horizontal plane with its open end toward the wearer when in use, said U-loop having a spread just sufficient to snugly receive a handset at a point adjacent the earpiece, and an angular bend in said shank directing the lower portion thereof toward the face of a wearer to position the mouth piece of such handset in proximity to the mouth of the wearer, and means for precluding shifting of said frame on the head under the weight of a handset supported in said U-loop, said means including a weight carried by said frame at its opposite end.

6. A handset holder comprising a head frame extending from one side of the head to the other when worn, said frame involving a pair of arched bands pivotally secured together at their ends; means suspended from an end of said frame for supporting a handset in position for use, with the earpiece adjacent the ear and the mouth piece in proximity to the mouth, said means including a shank of light rod adjustably affixed at one end to such end of said frame and depending therefrom, said shank at approximately the elevation of the cheek of the wearer, terminating in a laterally extending U-loop lying in substantially a horizontal plane with its open end toward the wearer when in use, said U-loop having a spread just sufficient to snugly receive a handset at a point adjacent the earpiece, and an angular bend in said shank directing the lower portion thereof toward the face of a wearer to position the mouth piece of such handset in proximity to the mouth of the wearer, and means for precluding shifting of said frame on the head under the weight of a handset supported in said U-loop, said means including a weight carried by said frame at its opposite end, said weight being in the form of knob to provide a hand grip for assistance in adjusting the frame to the head.

References Cited in the file of this patent

UNITED STATES PATENTS

| | | |
|---|---|---|
| 2,535,269 | Coie | Dec. 26, 1950 |
| 2,598,928 | McCorkell | June 3, 1952 |